C. L. MUNSINGER.
WIRE SPOOL CLAMP.
APPLICATION FILED FEB. 15, 1915.
1,166,536.
Patented Jan. 4, 1916.
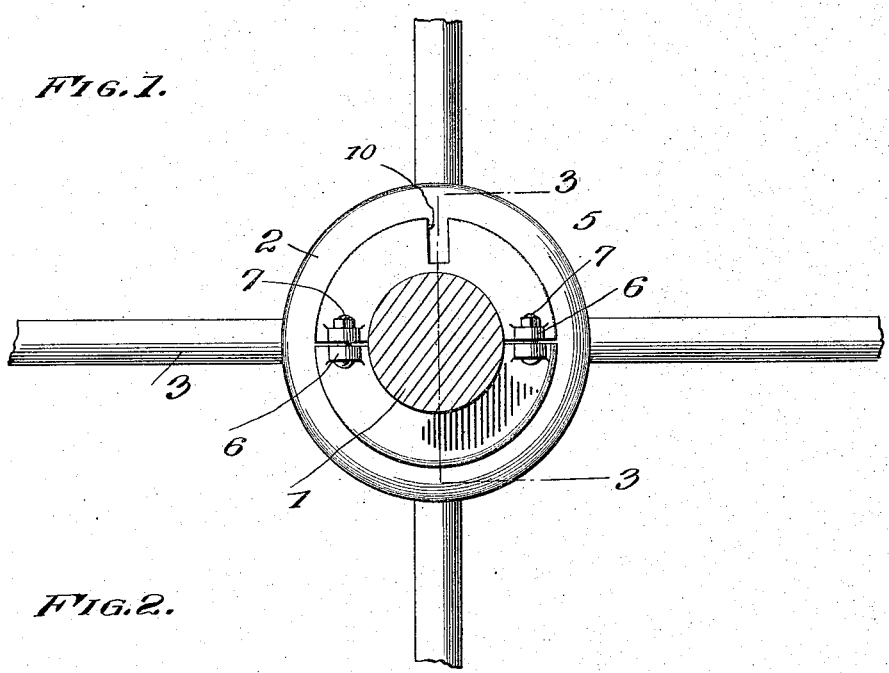
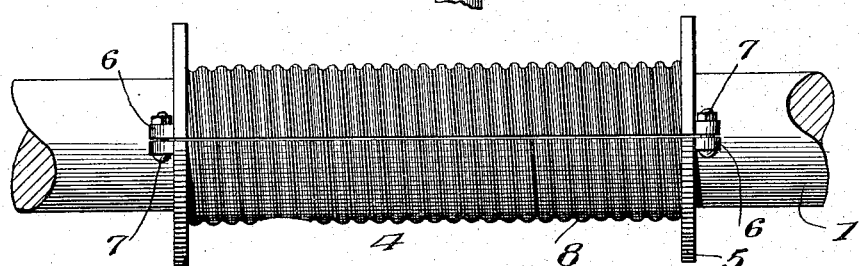
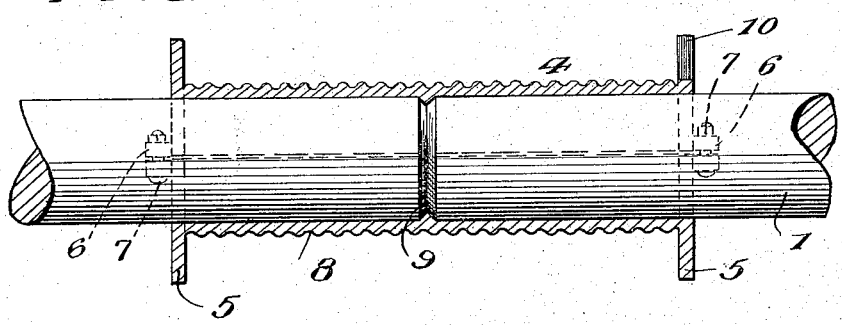
Inventor
C. L. Munsinger,
Witnesses
V. B. Hillyard.
By
Attorneys

UNITED STATES PATENT OFFICE.

CHARLES L. MUNSINGER, OF LIMA, OHIO.

WIRE-SPOOL CLAMP.

1,166,536.   Specification of Letters Patent.   Patented Jan. 4, 1916.

Application filed February 15, 1915. Serial No. 8,346.

*To all whom it may concern:*

Be it known that I, CHARLES L. MUNSINGER, a citizen of the United States, residing at Lima, in the county of Allen and State of Ohio, have invented certain new and useful Improvements in Wire-Spool Clamps, of which the following is a specification.

In the operation of oil wells and deep wells generally it is desirable at times to increase the diameter of the shaft of a bull or calf wheel, this depending upon the length of rope required in the performance of the work in hand.

The present invention provides simple and effective means for increasing the diameter of a shaft when required, such means being of a nature to be readily placed in position or removed from the shaft.

The present invention has relation to a spool having retaining heads or flanges, such spool comprising longitudinal sections or halves which are adapted to be placed about the shaft whose diameter is to be increased and secured by suitable fastening means which draw the sections together and clamp them about the shaft in such a manner as to hold the spool firmly and securely in place.

The invention is adapted for use in any location where the diameter of a shaft is required to be enlarged for any purpose.

With these and other objects in view, which will readily appear as the nature of the invention is better understood, the same consists in the improved construction and novel arrangement and combination of parts which will be hereinafter fully described and particularly claimed.

In the accompanying drawings has been illustrated a simple and preferred form of the invention, it being, however, understood that no limitation is necessarily made to the precise structural details therein exhibited, but that changes, alterations and modifications within the scope of the invention as claimed may be resorted to when desired.

Referring to the drawings, Figure 1 is a transverse section of a bull or calf wheel shaft provided with a spool embodying the invention, such spool being shown in end elevation. Fig. 2 is a side view of the spool showing a portion of the shaft. Fig. 3 is a longitudinal section on the line 3—3 of Fig. 1.

Corresponding and like parts are referred to in the following description and indicated in all the views of the drawings by the same reference characters.

The numeral 1 designates a shaft which is illustrated to show the application of the invention. In Fig. 1 a portion of a bull or calf wheel is illustrated, the same comprising a hub 2 and arms 3.

The spool may be of any length and diameter and comprises a body 4 and heads or end flanges 5. The spool is formed of longitudinal sections or halves to admit of the same being fitted about the shaft 1 when it is not otherwise convenient to slip the spool upon the shaft by an end-wise movement. The sectional formation of the spool also admits of drawing the parts together and clamping them about the shaft thereby securing the spool in the required position. In the preferable construction the spool comprises similar longitudinal sections or halves which may be constructed in any manner preferably by being cast. Each of the sections or halves is formed with outwardly extending lugs 6 which are transversely apertured to receive bolts 7 or like fastenings by means of which the halves or sections of the spool are drawn together and clamped about the shaft 1. The diameter of the opening formed when the sections of the spool are placed together is less than the diameter of the shaft to which the spool is to be fitted, hence when the spool is assembled about the shaft the meeting edges of the sections are spaced apart a short distance to admit of drawing the sections together by means of the fastenings 7 and clamping such sections about the shaft 1. A helical groove 8 is formed in the outer surface of the body or drum portion of the spool and receives the winds of a rope or cable and insures the formation of an even layer when the rope or cable is wound about the spool. To prevent any possible end-wise movement of the spool upon the shaft 1 and also to strengthen the body of the spool, the same is formed with an inner rib or flange 9 which extends around the inner wall so as to encircle the shaft 1, the latter being grooved to receive the rib. In the event of the shaft 1 being of wood the annular rib or flange 9 may embed itself into the shaft when drawing the halves or sections of the spool together. To facilitate this operation the rib 9 is of V-shape in cross section.

When it becomes necessary or desirable to increase the diameter of a shaft the sections comprising the spool are placed about the shaft and the fastenings 7 are passed through the openings of the lug 6 and said fastenings are tightened so as to draw the sections together and clamp them about the shaft, thereby fixing the position of the spool thereon. It is to be understood that the spool may be provided in different sizes with reference to diameter and length and also that the body portion of the spool may vary in thickness so that a shaft of given diameter may have a portion increased to the required diameter by fitting a spool thereto of the desired size.

An opening 10 is formed in one of the flanges or heads 5 of the spool for the passage of the cable. It is to be understood that in practice the surplus cable is wound upon the shaft 1 whereas that portion of the cable required for use is wound upon the spool.

Having thus described the invention, what is claimed as new is:—

A spool for increasing the diameter of a shaft, the same comprising similar longitudinal sections which are provided at their ends with outwardly extending lugs disposed about in line with the meeting edges of the sections and fastenings passing through the lugs for drawing the sections together and clamping them about a shaft, said spool having a helical groove in the outer side of its body or drum portion and having an inwardly extending annular rib and formed with outwardly extending flanges to form heads or end pieces.

In testimony whereof I affix my signature in presence of two witnesses.

CHARLES L. MUNSINGER. [L. S.]

Witnesses:
D. ROSENHEIM,
PAUL OLIVER.

Copies of this patent may be obtained for five cents each, by addressing the "Commissioner of Patents, Washington, D. C."